(12) United States Patent
Katsumata et al.

(10) Patent No.: US 6,377,411 B1
(45) Date of Patent: Apr. 23, 2002

(54) HEAD IC, HEAD AMPLIFIER CIRCUIT, HEAD SUSPENSION ASSEMBLY, AND MAGNETIC DISK DRIVE FOR AVOIDING ELECTROSTATIC BREAKDOWN OF MAGNETIC HEAD

(75) Inventors: Makoto Katsumata, Tachikawa; Kenji Tsuruta, Ome; Katsuhiko Kaida, Nishitama-gun, all of (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/385,731

(22) Filed: Aug. 30, 1999

(30) Foreign Application Priority Data

Dec. 25, 1998 (JP) .......................................... 10-369472

(51) Int. Cl.⁷ ............................................... G11B 5/09
(52) U.S. Cl. ........................... 360/46; 360/323; 360/68; 360/61
(58) Field of Search .............................. 360/323, 234.4, 360/244.1, 317, 68, 67, 46, 66, 61, 63, 327.1, 327.2

(56) References Cited

U.S. PATENT DOCUMENTS

| 5,559,051 A | 9/1996 | Voldman et al. |
| 5,712,747 A | 1/1998 | Voldman et al. |
| 5,748,412 A | * 5/1998 | Murdock et al. ........... 360/323 |
| 5,867,888 A | 2/1999 | Voldman et al. |
| 5,982,569 A | * 11/1999 | Lin et al. ...................... 360/32 |

FOREIGN PATENT DOCUMENTS

| JP | 58118016 | 7/1983 |
| JP | 58118017 | 7/1983 |
| JP | 6-70848 | 9/1994 |
| WO | WO 97/09714 | 3/1997 |

* cited by examiner

Primary Examiner—Alan T. Faber
(74) Attorney, Agent, or Firm—Gary Cary Ware & Friedenrich LLP

(57) ABSTRACT

A head suspension assembly for use in a magnetic disk drive includes a magnetic head constituted by a magnetoresistive element for reading data and a head element for writing data, a slider for holding the magnetic head above a surface of a rotating magnetic recording medium, a suspension for supporting the slider, and a head integrated circuit mounted on the suspension. The head integrated circuit having a built-in protection circuit electrically connected with the magnetoresistive element to protect the magnetoresistive element from electrostatic breakdown. Thereby, the magnetic head can be efficiently prevented from suffering electrostatic breakdown due to, e.g., electrostatic discharge occurring during the assembly process of incorporating the head suspension assembly into the magnetic disk drive.

5 Claims, 7 Drawing Sheets

HEAD IC, HEAD AMPLIFIER CIRCUIT, HEAD SUSPENSION ASSEMBLY, AND MAGNETIC DISK DRIVE FOR AVOIDING ELECTROSTATIC BREAKDOWN OF MAGNETIC HEAD

BACKGROUND OF THE INVENTION

The present invention relates to a head integrated circuit (IC), a head amplifier circuit, a head suspension assembly, and a magnetic disk drive for avoiding electrostatic breakdown of a magnetic head.

With conventional magnetic disk drives having built-in head suspension assemblies (HSA) each including a suspension on which a head is mounted, it is a standard practice to mount a head amplifier circuit including a read amplifier circuit which amplifies a signal read by the head from a magnetic recording medium, and a write driver circuit which allows the head to write data onto the magnetic recording medium by reversing a direction of current flow to the head, on a flexible printed circuit board (FPC) as a cabling member for interconnections.

The FPC (hereinafter referred to as the main FPC) is formed on top with a pattern of conductive interconnections connected with input/output terminals of the head amplifier circuit. On the opposite side of the interconnections to the head amplifier circuit are formed connection pads which correspond in number to head suspension assemblies (HSAs) used.

To each HSA is fixed a relay FPC which connects the electrodes of the corresponding head attached to its end with a preamplifier circuit through the main FPC. The relay FPC is formed with a pattern of interconnections which are connected at its one end with the electrodes of the corresponding head. The other end of the relay FPC forms a soldering portion consisting of electrode pads connected with the pattern of interconnections. The relay FPC is electrically and mechanically connected with the main FPC by soldering together each electrode pad of the relay FPC and a corresponding one of the connection pads of the main FPC.

Since the FPC has excellent flexibility, the movement of the head along the surface of a magnetic recording medium does never adversely affect the state of connection of the head with the head amplifier through the soldering portion.

As one of means for implementing high-density recording, a so-called combined separate type of magnetic head has recently been used in magnetic disk drives, which uses a magnetoresistive (MR) element that provides high reproduced output as a reproduction head and a thin-film head as a recording head. This type of head is called MR head.

The MR element in the MR head, while providing high reproduced output, has a drawback of being easy to suffer breakdown (electrostatic breakdown) due to electrostatic discharge (ESD). For this reason, a head amplifier circuit has also been developed recently which is equipped with a protection circuit for protecting the MR head from electrostatic breakdown due to ESD.

However, the provision of the MR protection circuit in the head amplifier does not always avoid the electrostatic breakdown of the MR head.

The inventors have found that the breakdown is easy to occur at the time of assembly work of incorporating the HSAs into the drive unit and that the breakdown is caused by ESD that occurs in the vicinity of the soldering portion of the relay FPC through a worker who is soldering together the relay FPC connected with the MR head and the main FPC on which the head amplifier is mounted. In such a case, the MR protection circuit, even if it is provided in the head amplifier circuit, does not function effectively against the ESD occurring in the vicinity of the soldering portion and the ESD directly affects the head. Thus, it is required to prevent effectively the MR head from suffering electrostatic breakdown due to ESD, particularly in the assembly process.

With increase in recording density, band limitation due to noise that occurs in interconnections between the head and the read amplifier and a degradation of the write characteristic due to inductance associated with interconnections between the head and the write driver circuit have become serious problems. It is required to solve these problems.

BRIEF SUMMARY OF THE INVENTION

Accordingly, it is an object of the present invention to provide a head IC, a head amplifier circuit, a head suspension assembly, and a magnetic disk drive which are capable of avoiding electrostatic breakdown of a magnetic head due to, e.g., the occurrence of electrostatic discharge during the assembly process of incorporating the head suspension assembly into the magnetic disk drive.

It is another object of the present invention to provide a head IC, a head amplifier circuit, a head suspension assembly, and a magnetic disk drive which are capable of minimizing the noise leaped in the interconnections between a magnetic head and a read amplifier circuit.

It is still another object of the present invention to provide a head IC, a head amplifier circuit, a head suspension assembly, and a magnetic disk drive which are capable of solving the problem of a degradation of the write characteristic due to inductance associated with interconnections between a magnetic head and a write driver amplifier circuit to be solved.

According to an aspect of the present invention, there is provided a head suspension assembly comprising a magnetic head constituted by a magnetoresistive element for reading data and a head element for writing data; a slider for holding the magnetic head above a surface of a rotating magnetic recording medium; a suspension for supporting the slider; and a head integrated circuit mounted on the suspension, the head integrated circuit including a built-in protection circuit, electrically connected with the magnetoresistive element, for protecting the magnetoresistive element from electrostatic breakdown.

In the head suspension assembly, the head IC may include at least one of a read amplifier circuit for amplifying a read signal read by the magnetoresistive element from the magnetic recording medium and a write driver circuit for supplying the writing head element with a write current corresponding to a write data signal.

According to another aspect of the present invention, there is provided a head amplifier circuit for use in a magnetic disk drive including a head suspension assembly having a magnetic head constituted by a magnetoresistive element for reading data and a head element for writing data, a slider for holding the magnetic head above a surface of a rotating magnetic recording medium, and a suspension for supporting the slider, the head amplifier circuit comprising a head IC (Integrated Circuit) mounted on the suspension, the head IC including a built-in protection circuit, electrically connected with the magnetoresistive element, for protecting the magnetoresistive element from electrostatic breakdown; and a control IC for controlling the head IC.

In the head amplifier circuit, the head IC may include at least one of a read amplifier circuit for amplifying a read signal read by the magnetoresistive element from the magnetic recording medium and a write driver circuit for supplying the writing head element with a write current corresponding to a write data signal.

According to still another aspect of the present invention, there is provided a head IC (Integrated Circuit) for use in a magnetic disk drive including a head suspension assembly having a magnetic head constituted by a magnetoresistive element for reading data and a head element for writing data, a slider for holding the magnetic head above a surface of a rotating magnetic recording medium, and a suspension for supporting the slider, the head IC being mounted on the suspension, the head IC comprising first and second MR terminals connected to both ends of the magnetoresistive element; a bias current terminal connected to receive an externally supplied bias current; and a protection circuit, connected with the first and second MR terminals and the bias current terminal, for protecting the magnetoresistive element from electrostatic breakdown.

The head IC may further comprise a read amplifier circuit for amplifying a read signal read by the magnetoresistive element from the magnetic recording medium. The head IC may further comprise an adjust circuit, connected between the protection circuit and a ground or negative power supply terminal, for adjusting an input impedance of the read amplifier circuit. In this case, the adjust circuit may include one of a resistor and a constant current source.

The head IC may further comprise a write driver circuit for supplying the writing head element with a write current corresponding to a write data signal. The head IC may further comprise a write current circuit for setting a value of the write current supplied from the write driver circuit to the writing head element in accordance with an externally supplied voltage signal.

The head IC may further comprise a read amplifier circuit, connected with the protection circuit, for amplifying a read signal read by the magnetoresistive element from the magnetic recording medium; and a write driver circuit for supplying the writing head element with a write current corresponding to a write data signal.

In the head IC, the protection circuit may includes a first switch circuit for connecting/disconnecting one of the first and second MR terminals to/from the bias current terminal; and a second switch circuit for connecting/disconnecting the other of the first and second MR terminals to/from a ground or negative power supply terminal. The protection circuit may include a voltage limiter circuit, connected between the first and second MR terminals, for limiting a voltage between the first and second MR terminals to a constant value or less. Each of the first and second switch circuits may be placed in a disconnected state while power is not supplied and in a connected state while power is supplied.

The head IC may further comprise a bias current amplifier circuit, connected between the protection circuit and the bias current terminal, for amplifying a bias current supplied from the bias current terminal. In this case, the protection circuit may includes a first switch circuit for connecting/disconnecting one of the first and second MR terminals to/from the bias current amplifier circuit, and a second switch circuit for connecting/disconnecting the other of the first and second MR terminals to/from a ground or negative power supply terminal. The protection circuit may include a voltage limiter circuit, connected between the first and second MR terminals, for limiting a voltage between the first and second MR terminals to a constant value or less.

According to still another aspect of the present invention, there is provided a magnetic disk drive equipped with a head suspension assembly, the head suspension assembly comprising a magnetic head constituted by a magnetoresistive element for reading data and a head element for writing data; a slider for holding the magnetic head above a surface of a rotating magnetic recording medium; a suspension for supporting the slider; and a head integrated circuit mounted on the suspension and including a built-in protection circuit, electrically connected with the magnetoresistive element, for protecting the magnetoresistive element from electrostatic breakdown.

The magnetic disk drive may further comprise a control integrated circuit for forming a head amplifier circuit in combination with the head integrated circuit and controlling the head integrated circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

A preferred embodiment of the present invention will now be described with reference to the accompanying drawings.

Figure 1:
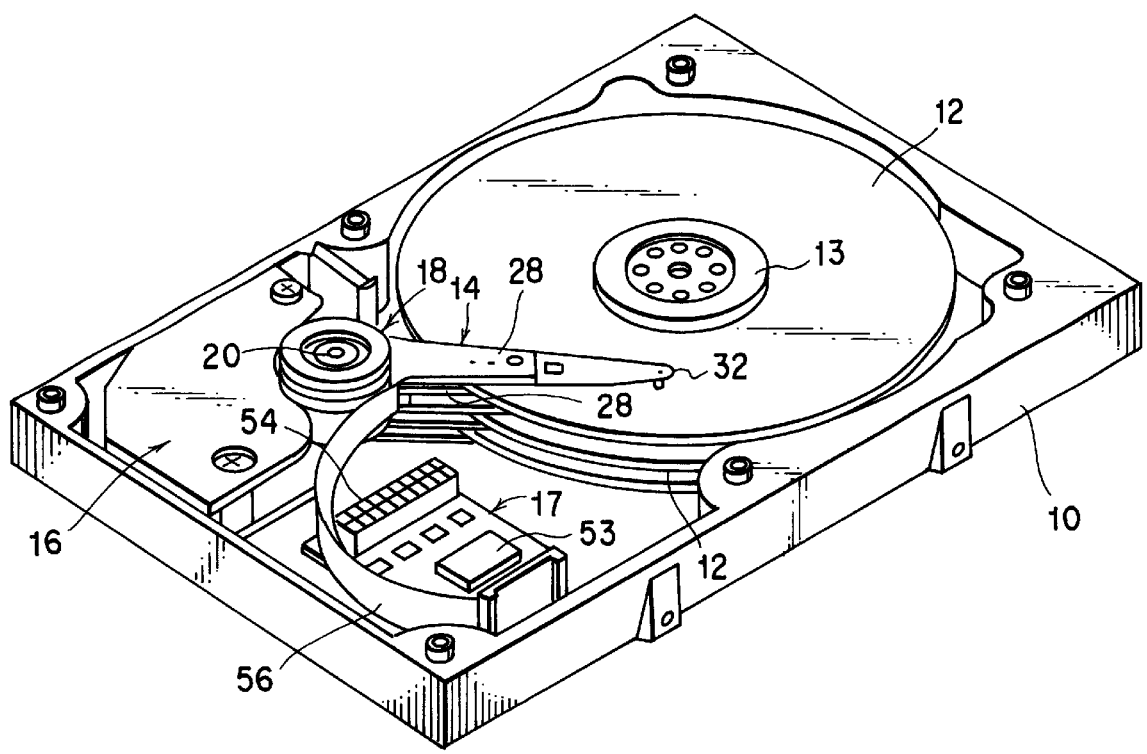
FIG. 1 is a perspective view showing the internal structure of a magnetic disk drive according to an embodiment of the present invention.

FIG. 1 is a perspective view of the internal structure of a magnetic disk drive according to an embodiment of the present invention.

The magnetic disk drive shown in FIG. 1 has a metal housing 10 formed in the shape of an open rectangular box and a top cover (not shown) which is screwed into the housing 10 to close it.

In the housing 10 are housed three magnetic disks 12, a spindle motor 13 for supporting and rotating these disks, magnetic heads 32 for recording/reproducing data onto/from the disks 12, carriage assemblies 14 for supporting the heads 32 so that they can move along the surfaces of the disks, a voice coil motor (hereinafter referred to as VCM) 16 for rotating and positioning the carriage assemblies, and a board unit 17.

A printed circuit board (not shown) on which circuits are mounted to control the operation of the spindle motor 13, the VCM 16, and the heads 32 is screwed into the outer surface of the housing 10 so that it is opposed to the bottom wall of the housing.

Each of the disks 12 is, for example, 65 mm (2.5 inches) in diameter and coated on both sides with a magnetizable recording layer. The three disks 12 are secured coaxially to the hub of the spindle motor 13 so that they are stacked with space between them in the axial direction of the hub. The disks 12 are rotated at a constant speed by the spindle motor 13.

The carriage assemblies 14 are equipped with a bearing assembly 18 fixed to the bottom of the housing 10. The bearing assembly 18 has an axis 20 mounted upright to the bottom of the housing 10 and a hub (not shown) in the form of a cylinder which is supported rotatably through a pair of bearings by the axis.

The carriage assemblies 14 are each provided for a respective one of the sides of the three disks 12 and have six head suspension assemblies (hereinafter referred to as HSA) 28 attached to the hub of the bearing assembly 18.

Figure 2:
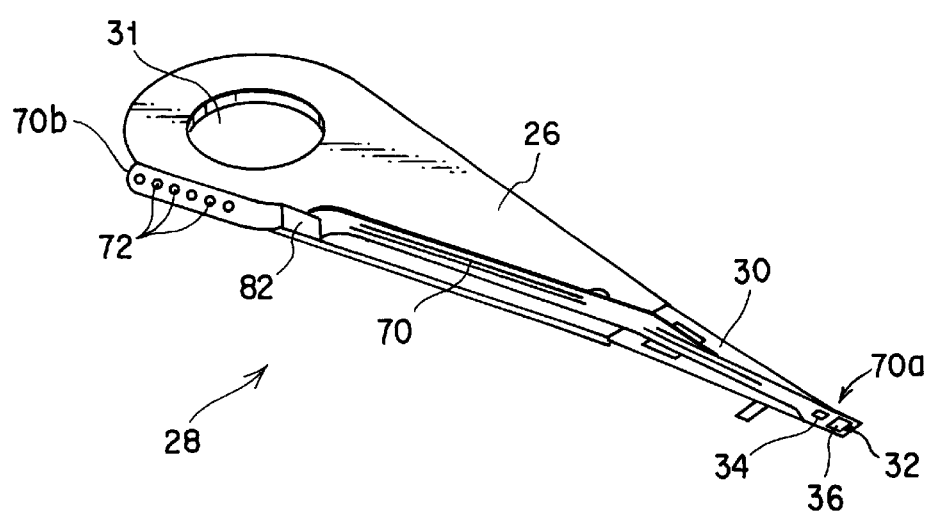
FIG. 2 is a perspective view of the head suspension assembly (HSA) show in FIG. 1.

The HSA 28 is provided, as shown in FIG. 2, with an arm 26 and a suspension 30 which has its base end fixed to the tip of the arm 26 by spot welding or bonding and extends from the arm. The arm 26 is formed from a stainless material, such as SUS304, into a planar plate which is small in thickness, of the order of 250 µm and is formed at its base end with a circular hole 31 into which the hub of the bearing assembly 18 is inserted. The suspension 30 is formed from an elongate plate spring having a thickness of 60 to 70 µm. The suspension 30 may be formed from the same material as the arm 26 so that they are integral with each other.

Figure 7:
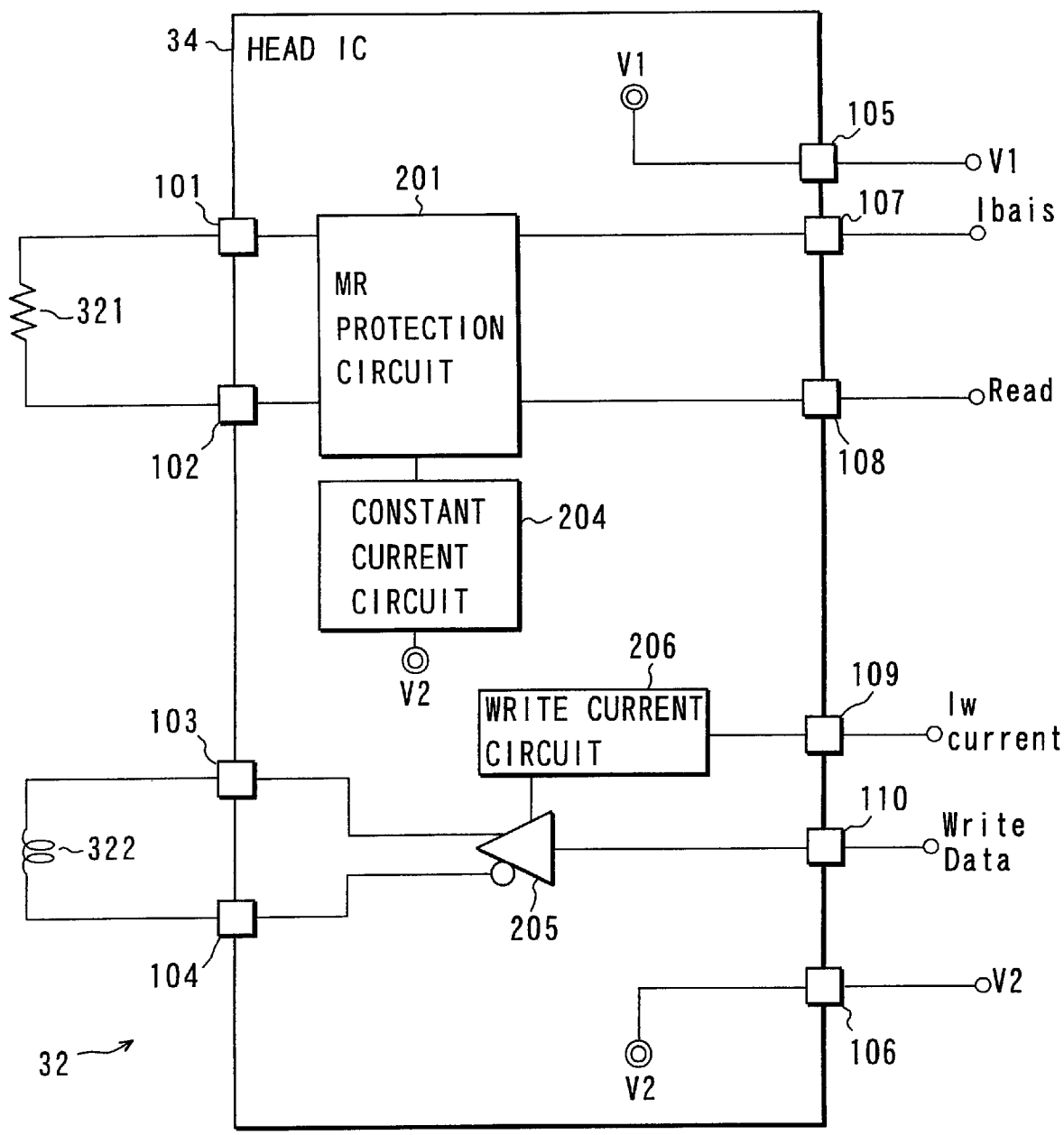
FIG. 7 is a block diagram of a third arrangement of the head IC.
Figure 8:
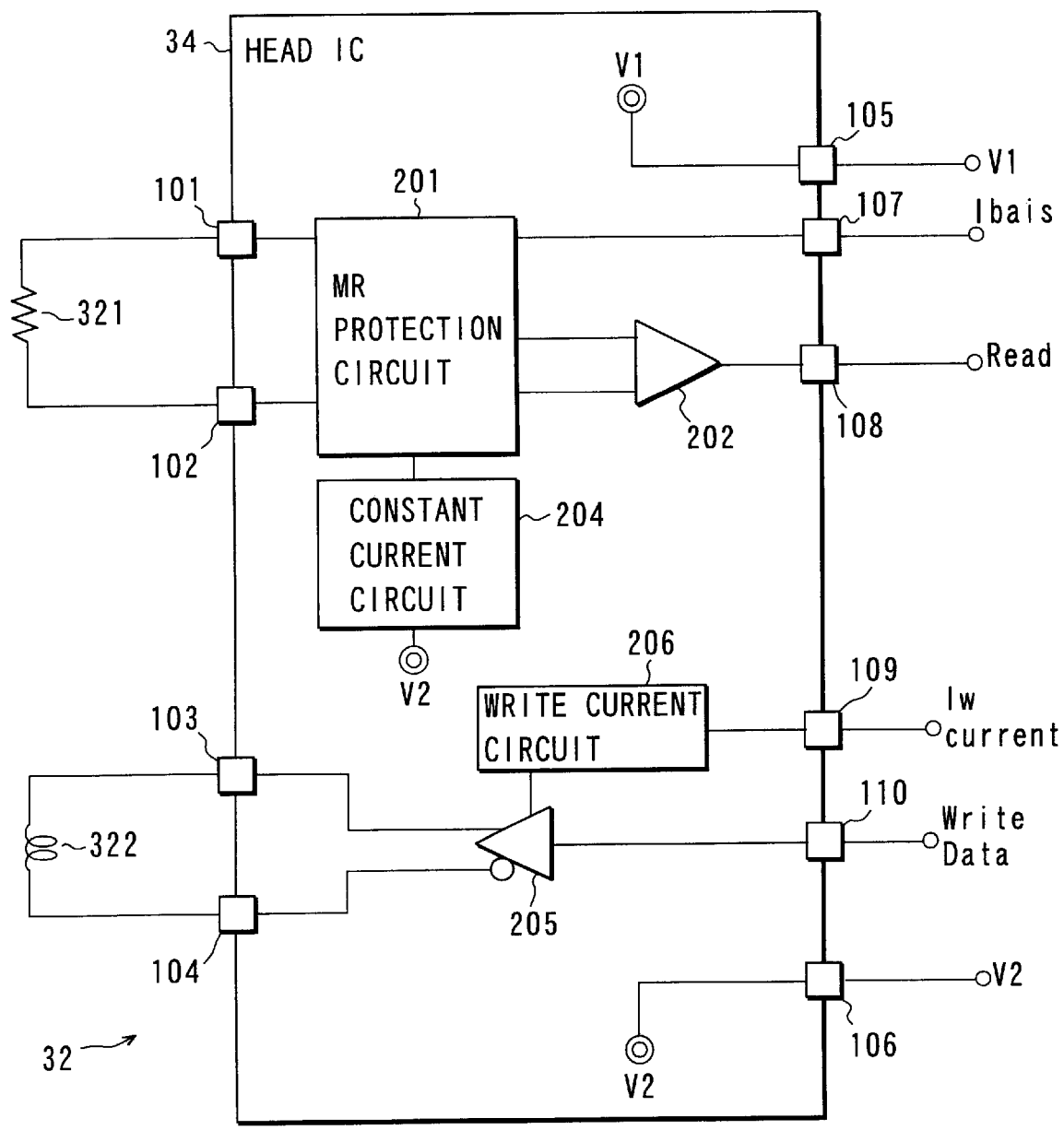
FIG. 8 is a block diagram of a fourth arrangement of the head IC.
Figure 11:
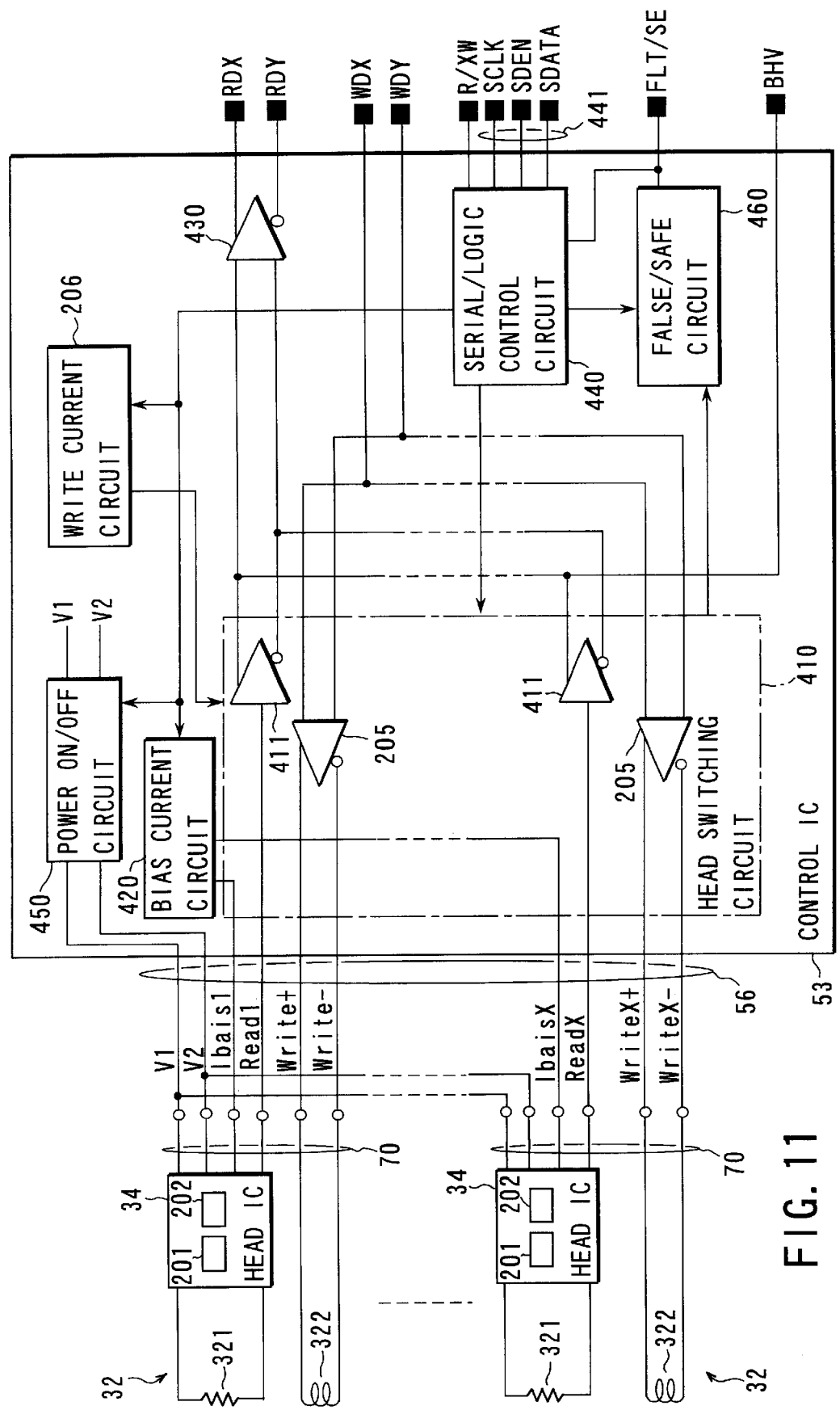
FIG. 11 is a block diagram of the control IC mounted on the board unit when the head IC is arranged as shown in FIG. 5.

The HSA 28 further includes a magnetic head 32 and a head IC 34 which are attached to the end of the suspension 30. The head 32 is a combined separate type of magnetic head which is constituted by a magnetoresistive element (hereinafter referred to as MR element) 321 adapted for reproducing (reading) as shown in FIGS. 5 to 9 and FIG. 11 and a thin-film head 322 adapted for recording (writing) as shown in FIGS. 7, 8 and 11. The head IC 34 is mounted in the form of a bare chip on the suspension 30.

Figure 3:
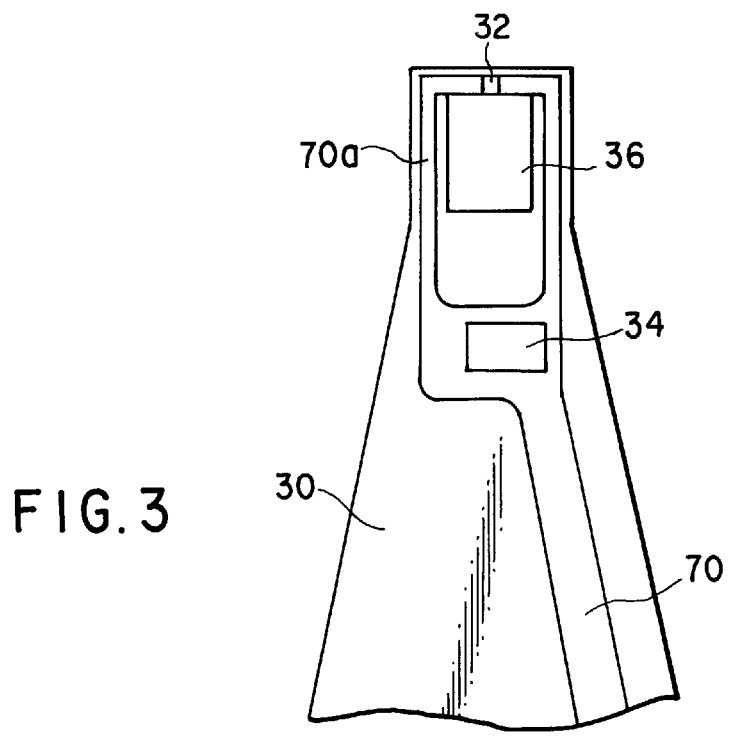
FIG. 3 is a plan view of the suspension in the HSA on which the MR head and the head IC are mounted.

FIG. 3 shows the structure in which the MR head 32 and the head IC 34 are mounted on the suspension 30.

As shown, the MR head 32 is installed in a substantially rectangular slider 36 fixed to a gimbal formed at the tip of the suspension 30. The slider 36 has the role to hold the head 32 above the surface of the rotating disk 12 so as to keep a constant distance from the surface of the rotating disk 12.

On the other hand, the head IC 34 is mounted in the position closer to the arm 26 as viewed from the slider 36. That is, the head IC and the MR head are mounted on opposite sides of the slider.

The head 32 and the head IC 34 mounted on the suspension 30 of the HSA 28 are electrically connected together by a pattern of interconnections formed on a relay flexible printed circuit board (hereinafter referred to as relay FPC) 70 as a cabling member. The relay FPC 70 is attached to the surfaces of the arm 26 and the suspension 30 of the HSA 28 with adhesive so as to extend from the tip of the suspension 30 to the base end of the arm 26 as shown in FIG. 2.

The relay FPC 70 is shaped into an elongate stripe form as a whole and has a tip portion 70a positioned at the tip of the suspension 30 and a soldering portion (connecting portion) 70b derived from the base end of the arm 26. The tip portion 70a is formed with electrode pads (not shown) which are electrically connected with the electrodes of the MR head 32 and the electrodes of the head IC 34. The soldering portion 70b has six electrode pads 72.

That portion of the relay FPC 70 which corresponds to the base end side of the arm 26 is bent substantially at right angles, forming the bent portion 82. Thus, the soldering portion 70b of the relay FPC 70 extends at right angles with respect to the surface of the arm 26 and in parallel with an extending end portion 56a of the main FPC 56 fixed to the bearing assembly 18.

Referring back to FIG. 1, the board unit 17 has a rectangular board 52 fixed to the bottom of the housing 10, which has electronic components including a control IC 53 and a connector 54 mounted on it.

The board unit 17 has a main flexible printed circuit board (hereinafter referred to as main FPC) 56 in the form of a strip that connects the head ICs 34 of the HSAs 28 to the board 52 through the relay FPCs 70.

Figure 4:
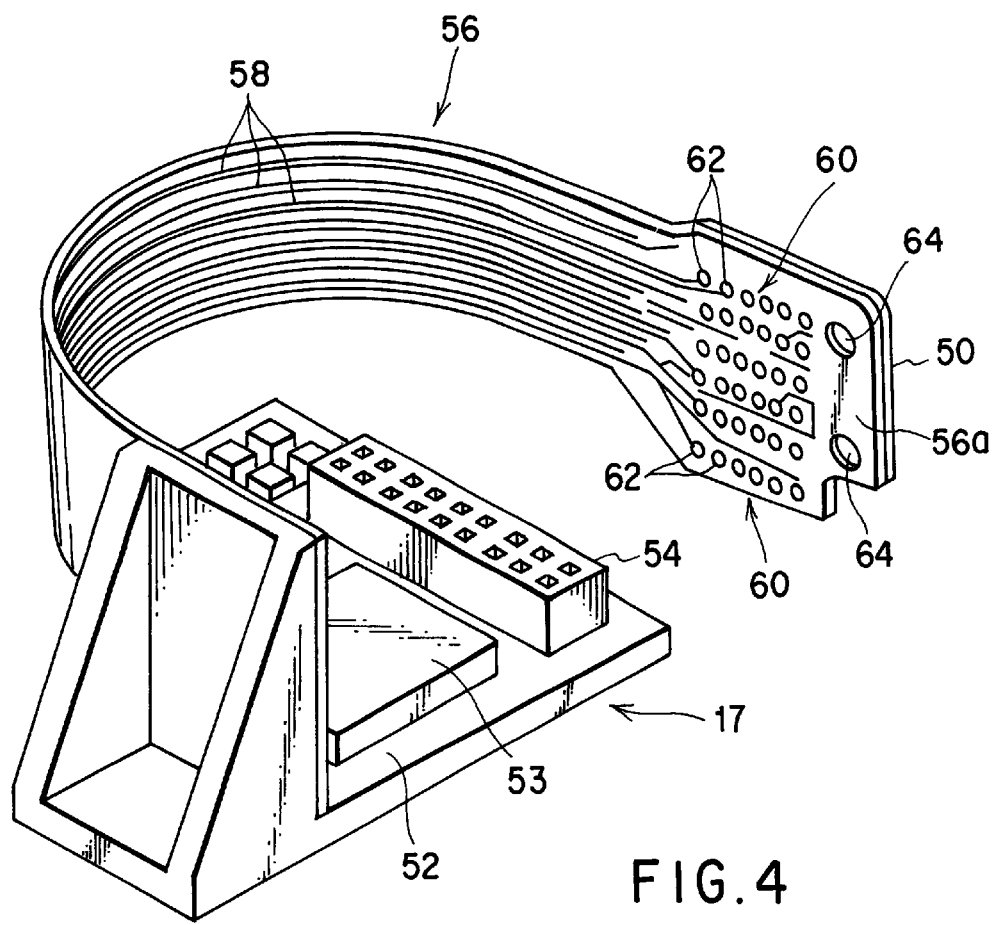
FIG. 4 is a perspective view of the board unit and the main FPC shown in FIG. 1.

The main FPC 56 is drawn from the board 52 as shown in FIG. 4. A reinforcing plate 50 is attached to the rear side of the leading portion 56a of the main FPC 56. A pair of holes 64 is formed in the leading portion 56a. The leading portion 56a is screwed through the holes 64 into to the bearing assembly 18 of the carriage assembly 14. The main FPC 56 is formed integral with the board 52 by the flexible printed circuit board.

A pattern of interconnections 58 is formed on the main FPC 56 which extend in parallel with one another along the axial direction of the main FPC 56. The leading portion 56a of the main FPC 56 is formed with six sets of connection pad portions 60 in correspondence with the number of the heads 32. In this embodiment, each connection pad portion 60 comprises six connection pads 62, which are arranged in a line at regular intervals along the axial direction of the main FPC 56. The connection pad portions 60 are arranged in parallel with one another with space between them in the direction perpendicular to the axial direction of the main FPC 56.

The six connection pads 62 in each connection pad portion 60 are electrically connected with the board 52 through the pattern of interconnections 58.

The soldering portion 70b of the relay FPC 70 extending from the suspension 30 of each HSA 30 to the corresponding arm 26 is electrically and mechanically connected with the leading portion 56a of the main FPC 56 by soldering each of the six connection pads 72 and a corresponding one of the six connection pads 62 in the corresponding set of connection pads on the main FPC 56 side.

Next, the arrangement of the head IC 34 mounted on the suspension 30 of the HSA 28 will be described with reference to FIGS. 5 through 8. Four arrangements of the head IC are described herein.

[First Arrangement of Head IC]

Figure 5:
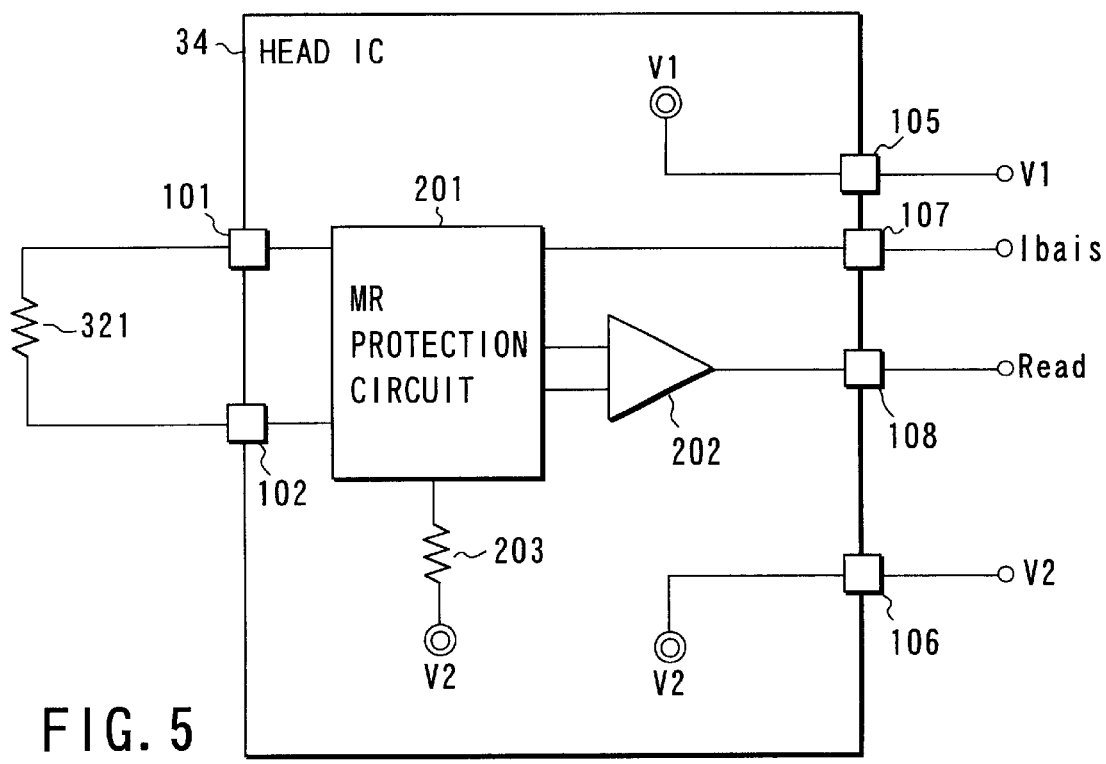
FIG. 5 is a block diagram of a first arrangement of the head IC.

In FIG. 5, there is illustrated, in block diagram form, a first arrangement of the head IC 34.

The head IC 34 has a first MR terminal 101, a second MR terminal 102, a first power supply terminal 105, a second power supply terminal 106, a bias current terminal 107, and a read output terminal 108.

The head IC 34 has an MR protection circuit 201, a differential input type of read amplifier circuit 202, and a resistor 203 built in. The MR protection circuit 201 is adapted to protect the MR element 321 in the MR head 32 from electrostatic breakdown, and the resistor 203 serves as an adjust circuit for balancing (adjusting) the input impedance of the read amplifier circuit 202.

It should be noted here that the head IC 34 of FIG. 5 has no write driver circuit built in. The write driver circuit is formed in the control IC 53 (see FIG. 11) mounted on the board unit 17 shown in FIGS. 1 and 4.

To the first and second MR terminals 101 and 102 of the head IC 34 are connected both ends of the MR element 321 of the MR head 32. To the first and second power supply terminals 105 and 106, the bias current terminal 107 and the read output terminal 108 is connected the control IC 53 on the board unit 17 through the relay FPC 70 and the main FPC 56. Though not shown in FIG. 5, the two terminals (electrodes) of the thin-film head 322 for writing are directly connected to the control IC 53 through the relay FPC 70 and the main FPC 56 with no head IC involved.

A total of six head ICs 34 mounted on the suspensions 30 of the HSAs 28 and the control IC 53 mounted on the board unit 17 form the head amplifier circuit. That is, this embodiment is characterized in that the function of the head amplifier circuit is shared between the suspensions 30 of the HSAs 28 and the board units 17.

In the head IC 34 forming a part of the head amplifier circuit, the first and second MR terminals 101 and 102 are connected through the MR protection circuit 201 to the read amplifier circuit 202, which has its output connected to the read output terminal 108.

As is evident from the above description, this embodiment is arranged such that the head ICs 34 forming part of the head amplifier circuit are mounted on the suspensions 30 of the HSAs 28 not on the board unit 17 and the MR protection circuit 201 is built into each head IC 34. For this reason, even if ESD (electrostatic discharge) occurs in the vicinity of the soldering portion 70b through the worker when he or she is soldering the electrode pads 72 in the soldering portion of the relay FPC 70 and the electrode pads 62 of the main FPC 56, the MR protection circuit 201 in the head IC 34 installed between the soldering portion and the MR element 321 of the MR head 32 effectively functions to protect the MR element 321 from electrostatic breakdown.

If the MR protection circuit were built into the head amplifier circuit provided on the board unit 17 side as hitherto, the occurrence of ESD during soldering would cause discharge current due to ESD to flow in the MR element independently of the MR protection circuit, destroying the MR element.

In this embodiment, the function of the head amplifier circuit is shared between the suspensions 30 of the HSAs 28 and the board unit 17, which, as will be described hereinafter, helps reduce the number of interconnections for connecting the head ICs 34 which correspond in number to the MR heads 32 (six in this example) with the control IC 53.

In the head IC 34 of FIG. 5, a supply voltage is supplied from the control IC 53 over the main FPC 56 and the relay FPC 70 to the first and second power supply terminals 105 and 106, where a positive power is supplied to the first power supply terminal 105 and a negative power (or ground level) is supplied to the second power supply terminal 106.

The bias current terminal 107 of the head IC 34 is supplied with a bias current from the control IC 53 through the main FPC 56 and the relay FPC 70. This bias current is supplied to the MR element 321 through the MR protection circuit 201 and the first MR terminal 101 and then returns to a second power supply V2 at the negative or ground level through the second MR terminal 102, the MR protection circuit 201, and the resistor 203.

When a bias current is supplied from the head IC 34 to the MR element 321, data recorded on a track of the disk 12 (see FIG. 1) over which the MR element 321 of the MR head 32 is currently positioned is read (reproduced). The signal (read signal) read by the MR element 321 is conducted through the first and second MR terminals 101 and 102 and the MR protection circuit 201 to the read amplifier circuit 202. The signal amplified by the read amplifier circuit 202 is output to the read output terminal 108. The appropriate setting of the value of the resistor 203 allows the differential input impedance of the read amplifier circuit 202 to be balanced, allowing the read signal to be amplified with precision.

The read signal output from the read amplifier circuit 202 to the read output terminal 108 is sent to the control IC 53 through the relay FPC 70 and the main FPC 56.

At the time of writing, on the other hand, a write current from the write driver circuit 205 (see FIG. 11) in the control IC 53 is directly supplied to the thin-film head 322 via the main FPC 56 and the relay FPC 70 without passing through the head IC 34.

By using the head IC arranged described above, this embodiment, it becomes possible to not only efficiently prevent the MR head 32 by the MR protection circuit 201 from suffering electrostatic breakdown during the assembly process of incorporating the HSA 28 into the disk drive unit as described previously, but also allow the number of interconnections formed on the relay FPC 70 attached to the arm 26 and the suspension 30 of the HSA 28, i.e., the number of electrode pads 72 of the soldering portion 70b, to be six in total; four for the first power supply VI, the second power supply V2, the bias current, and the read signal (read output signal), and two for connection to the thin-film head 25. That is, this embodiment requires addition of only two interconnections in comparison with the case where no head IC 34 is mounted on the HAS 28. Thus, an increase in soldering cost resulting from mounting the head IC 34 on the HSA 28 can be minimized. In addition, the formation of the electrode pads 72 on the relay FPC 70 is kept from becoming difficult.

Furthermore, the incorporation of the read amplifier circuit 202 into the head IC 34 not into the control IC 53 on the board unit 17 side, i.e., the placement of the read amplifier circuit in the vicinity of the MR head 32 allows noise occurring in the interconnections between the MR head 32 and the read amplifier circuit 202 to be decreased significantly, implementing high-density recording based on the MR head 32.

[Second Arrangement of Head IC]

A second arrangement of the head IC 28 mounted on the suspension of the HSA 28 will be described with reference to FIG. 6, in which like reference numerals are used to denote corresponding components to those in FIG. 5.

Figure 6:
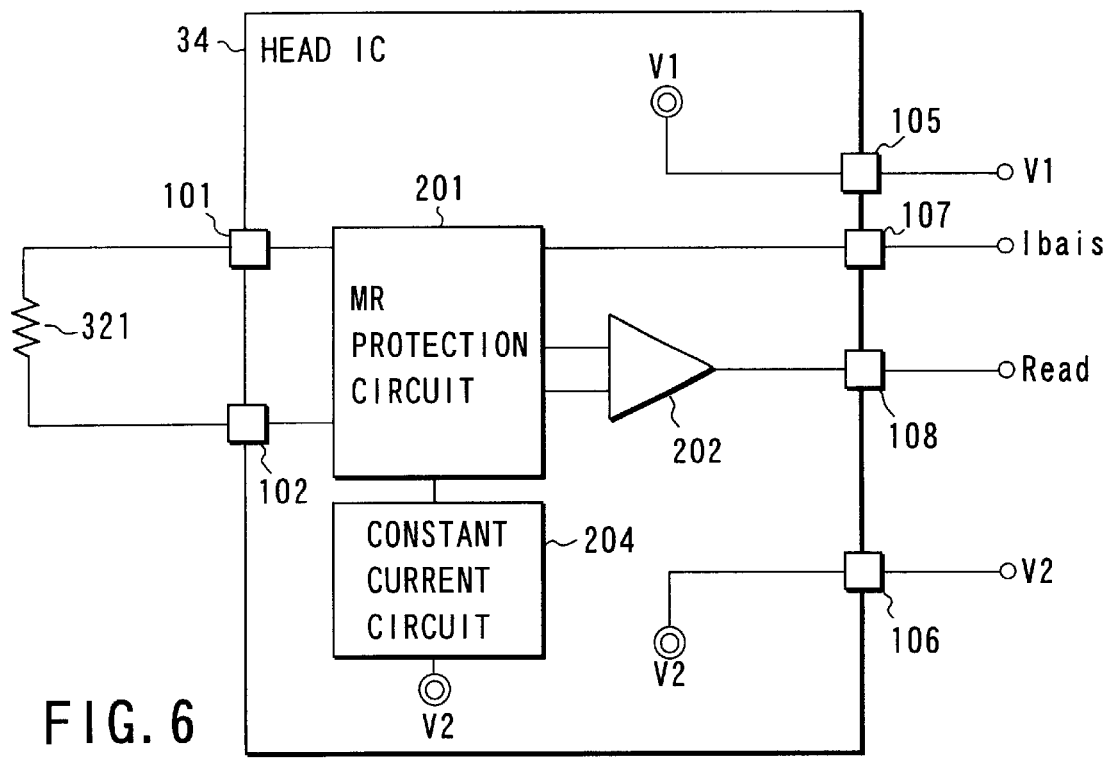
FIG. 6 is a block diagram of a second arrangement of the head IC.

The head IC 34 of FIG. 6 is characterized in that, as the adjust circuit for balancing the input impedance of the read amplifier circuit 202, a constant current circuit 204 is used instead of the resistor 203 used in the arrangement of FIG. 5.

In the arrangement of FIG. 6, the MR element 321 has its ends connected through the first and second MR terminals 101 and 102 and the MR protection circuit 201 to the read amplifier circuit 202. The read amplifier circuit 202 amplifies a read signal from the MR element 321 and provides the amplified read signal to the output terminal 108. The bias current terminal 107 is supplied with a bias current from the control IC 53 over the main FPC 56 and the relay FPC 70. This bias current is supplied to the MR element 321 through the MR protection circuit 201 and the first MR terminal 101 and then returns to the second power supply V2 through the second MR terminal 102, the MR protection circuit 201, and the constant current source 204. The supply voltage is supplied from the control IC 53 through the main FPC 56, the relay FPC 70, and the first and second power supply terminals 105 and 106.

In this arrangement, as in the first arrangement, the MR head 32 is efficiently prevented by the MR protection circuit 201 from suffering electrostatic breakdown during the assembly process of incorporating the HSA 28 into the disk drive unit, and the number of electrode pads 72 of the soldering portion 70b of the relay FPC 70 is allowed to be six in total; four for the first power supply V1, the second power supply V2, the bias current, and the read output signal, and two for connection to the thin-film head 25. Moreover, noise occurring in the interconnections between the MR head 32 and the read amplifier circuit 202 can be reduced significantly. Furthermore, using the constant current circuit 204 instead of the resistor 203 allows the input impedance of the read amplifier circuit 202 to be balanced better than in the case where the resistor 203 is used.

[Third Arrangement of Head IC]

A third arrangement of the head IC 34 mounted on the suspension of the HSA 28 will be described with reference to FIG. 7, in which like reference numerals are used to denote corresponding components to those in FIG. 6.

Unlike the head IC of FIG. 6, in the head IC 34 of FIG. 7, the read amplifier circuit 202 is not built in, but a write driver circuit 205 and a write current circuit 206 are built in instead. In this case, unlike the previous example, the control IC 53 has the read amplifier circuit 202 built in but has no write driver circuit 205 and write current circuit 206 built in.

The head IC 34 of FIG. 7 has a first MR terminal 101, a second MR terminal 102, a first power supply terminal 105, a second power supply terminal 106, a bias current terminal 107, a read output terminal 108, a write current setting terminal 109, and a write data terminal 110.

The head IC 34 has an MR protection circuit 201 for protecting the MR element 321 from electrostatic breakdown, a constant current circuit 204, a write driver circuit 205, and a write current circuit 206 built in.

Both ends of the MR element 321 of the MR head 32 are connected to the first and second MR terminals 101 and 102 of the head IC 34. Likewise, both ends of a thin-film head 322 of the MR head 32 are connected to first and second thin-film terminals 103 and 104. To the first and second power supply terminals 105 and 106, the bias current terminal 107, the read output terminal 108, the write current setting terminal 109 and the write data terminal 110 is connected the control IC 53 on the board unit 17 through the relay FPC 70 and the main FPC 56.

In the head IC 34 of FIG. 7, a supply voltage is supplied from the control IC 53 through the main FPC 56 and the relay FPC 70 to the first and second power supply terminals 105 and 106, where a positive power is supplied to the first power supply terminal 105 and a negative power (or ground level) is supplied to the second power supply terminal 106.

Moreover, in the head IC 34 of FIG. 7, the bias current terminal 107 of the head IC 34 is supplied with a bias current from the control IC 53 over the main FPC 56 and the relay FPC 70. This bias current is supplied to the MR element 321 through the MR protection circuit 201 and the first MR terminal 101 and then returns to a second power supply V2 through the second MR terminal 102, the MR protection circuit 201, and the constant current circuit 204. The constant current circuit 204 may be replaced with the resistor 203 shown in FIG. 5.

A read signal from the MR element 321 is conducted through the first and second MR terminals 101 and 102 and the MR protection circuit 201 to the bias current terminal 107 and the read output terminal 108. The read signal conducted through the first and second MR terminals 101 and 102 is then sent to the read amplifier circuit in the control IC 53 over the relay FPC 70 and the main FPC 56.

At the time of writing of data, on the other hand, write current is supplied to the thin-film head 322 from the write driver circuit 205 that reverses the direction of current flow at the edges of a write data signal from the write data terminal 110, so that data is written (recorded) onto a track of the disk 12 (see FIG. 1) over which the thin-film head 322 of the MR head 32 is positioned. The value of a current supplied from the write driver circuit 205 to the thin-film head 322 is determined by the write current circuit 206 in accordance with a voltage signal supplied from the control IC 53 over the main FPC and the relay FPC to the write current setting terminal 109.

By using the head IC 34 arranged described above, this embodiment, it becomes possible to not only efficiently prevent the MR head 32 by the MR protection circuit 201 from suffering electrostatic breakdown during the assembly process of incorporating the HSA 28 into the disk drive unit, but also allow the number of interconnections formed on the relay FPC 70 attached to the arm 26 and the suspension 30 of the HSA 28, i.e., the number of electrode pads 72 of the soldering portion 70b, to be six in total; for the first power supply V1, the second power supply V2, the bias current, the read signal (read output signal), the write data, and the write current setting signal. That is, this embodiment requires addition of only two interconnections in comparison with the case where no head IC is mounted on the HAS 28. Thus, an increase in soldering cost resulting from mounting the head IC 34 on the side of the HSA 28 can be minimized. In addition, the formation of the electrode pads 72 on the relay FPC 70 is kept from becoming difficult.

Furthermore, the incorporation of the write driver circuit 205 into the head IC 34 not into the control IC 53 of the board unit 17 reduces the distance between the write driver circuit 205 and the MR head 32, allowing inductance of the interconnections on the relay FPC 70 between the MR head 32 and the write driver circuit 205 to be reduced and thus allowing the write current to the head to rise and fall quickly. High-density recording can therefore be accomplished.

[Fourth Arrangement of Head IC]

A fourth arrangement of the head IC 34 mounted on the suspension of the HSA 28 will be described with reference to FIG. 8, in which like reference numerals are used to denote corresponding components to those in FIG. 6.

The head IC 34 of FIG. 8 is characterized by addition of the write driver circuit 205, the write current circuit 206, the write current setting terminal 109, and the write data terminal 110 shown in FIG. 7 to the arrangement of FIG. 6.

The bias current terminal 107 of the head IC 34 is supplied with a bias current from the control IC 53 over the main FPC 56 and the relay FPC 70. This bias current is supplied to the MR element 321 through the MR protection circuit 201 and the first MR terminal 101 and then returns to the second power supply V2 through the second MR terminal 102, the MR protection circuit 201, and the constant current circuit 204. The constant current circuit 204 may be replaced with the resistor 203 shown in FIG. 5.

A read signal from the MR element 321 is conducted through the MR protection circuit 201 to the read amplifier circuit 202 and then output to the read output terminal 108. The read signal amplified by the read amplifier circuit 202 is then sent to the control IC 53 over the relay FPC 70 and the main FPC 56.

At the time of writing of data, on the other hand, write current is supplied to the thin-film head 322 from the write driver circuit 205 that reverses the direction of current flow at the edges of a write data signal from the write data terminal 110, so that data is written (recorded) onto a track of the disk 12 (see FIG. 1) over which the thin-film head is positioned. The value of a current supplied from the write driver circuit 205 to the thin-film head 322 is determined by the write current circuit 206 in accordance with a voltage signal supplied from the control IC 53 over the main FPC 56 and the relay FPC 70 to the write current setting terminal 109.

Therefore, like the third arrangement, the head IC 34 of FIG. 8 allows the MR protection circuit 201 to efficiently prevent the MR head 32 by the MR protection circuit 201 from suffering electrostatic breakdown during the assembly process of HSA 28 and allows the number of electrode pads 72 of the soldering portion 70b of the relay FPC 70 attached to the arm 26 and the suspension 30 of the HSA 28 to be six in total; for the first power supply V1, the second power supply V2, the bias current, the read signal (read output signal), the write data, and the write current setting signal.

Furthermore, the incorporation of the read amplifier circuit 202 and the write driver circuit 205 into the head IC 34 not into the control IC 53 reduces the distance between the write driver circuit 205/read amplifier circuit 202 and the MR head 32, allowing noise occurring in interconnections on the relay FPC 70 between the MR head and the read amplifier circuit to be reduced and allowing inductance of the interconnections on the relay FPC 70 between the thin-film head 322 of the MR head 32 and the write driver circuit 205 to be reduced to thereby cause the write current to the head to rise and fall quickly. High-density recording can therefore be accomplished.

[Fifth Arrangement of Head IC]

A fifth arrangement of the head IC 34 mounted on the suspension of the HAS 28 will be described with reference to FIG. 9, in which like reference numerals are used to denote corresponding components to those in FIG. 6.

Figure 9:
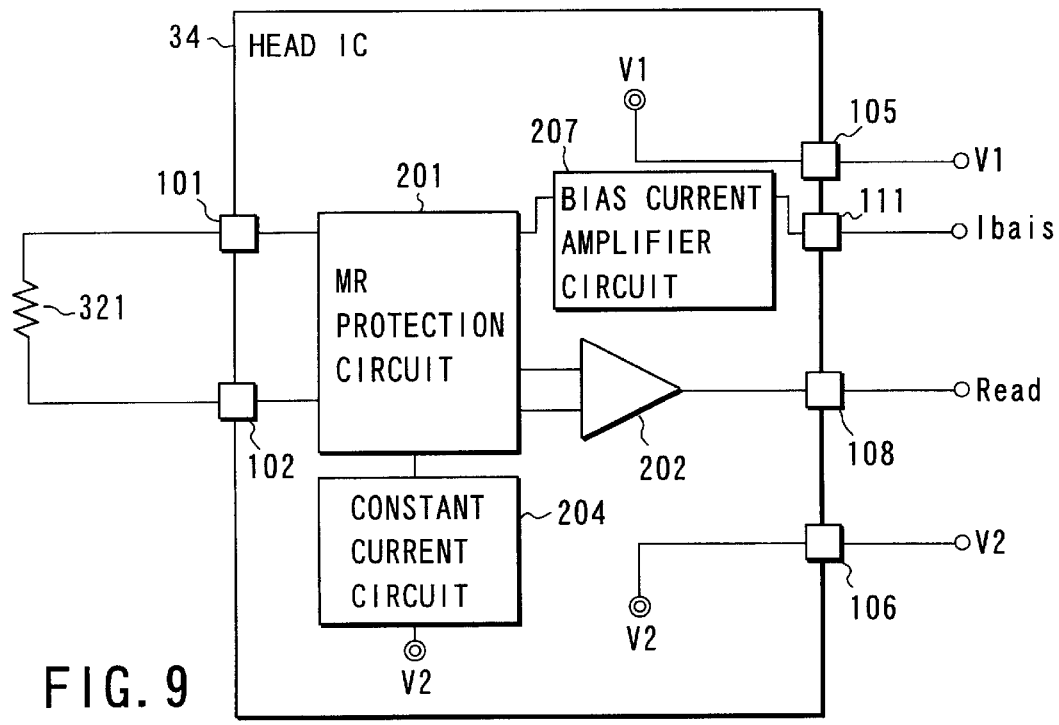
FIG. 9 is a block diagram of a fifth arrangement of the head IC.

The head IC 34 of FIG. 9 is characterized by replacing the bias current terminal 107 of FIG. 6 with a bias current setting terminal 111 for receiving an externally supplied bias current setting signal for setting the bias current value and adding a bias current amplifier circuit 207 for producing a bias current having a value determined by the bias current setting signal.

In the head IC 34 of FIG. 9, the bias current setting terminal 111 is supplied with the bias current setting signal from the control IC 53 over the main FPC 56 and the relay FPC 70. The bias current amplifier 207 produces a bias current the value of which depends on the bias current setting signal. This bias current is supplied to the MR element 321 through the MR protection circuit 201 and the first MR terminal 101 and then returns to the second power supply V2 through the second MR terminal 102, the MR protection circuit 201, and the constant current circuit 204. The constant current circuit 204 may be replaced with the resistor 203 shown in FIG. 5.

A read signal from the MR element 321 is conducted through the MR protection circuit 201 to the read amplifier circuit 202 and then output to the read output terminal 108. The read signal amplified by the read amplifier circuit 202 is then sent to the control IC 53 through the relay FPC 70 and the main FPC 56.

The write driver circuit 205, the write current circuit 206, the write current setting terminal 109 and the write data terminal 110 shown in FIGS. 7 and 8 may be added to the arrangement of FIG. 9.

With this arrangement, as in the first arrangement, the MR head 32 is efficiently prevented by the MR protection circuit 201 from suffering electrostatic breakdown during the assembly process of incorporating the HSA 28 into the disk drive unit, and the number of electrode pads 72 of the soldering portion 70b of the relay FPC 70 is allowed to be six in total; four for the first power supply V1, the second power supply V2, the bias current, and the read output signal, and two for connection to the thin-film head 25. Moreover, noise occurring in the interconnections between the MR head 32 and the read amplifier circuit 202 can be suppressed significantly.

Unlike the first arrangement, in the fifth arrangement, the bias current setting terminal 111 is provided instead of the bias current terminal 107 and the bias current amplifier circuit 207 is provided to thereby allow the bias current amplifier circuit 207 to produce a bias current in accordance with a bias current setting signal externally supplied to the bias current setting terminal 111, thus making the bias current less susceptible to noise.

[Arrangement of MR Protection Circuit 201]

Figure 10:
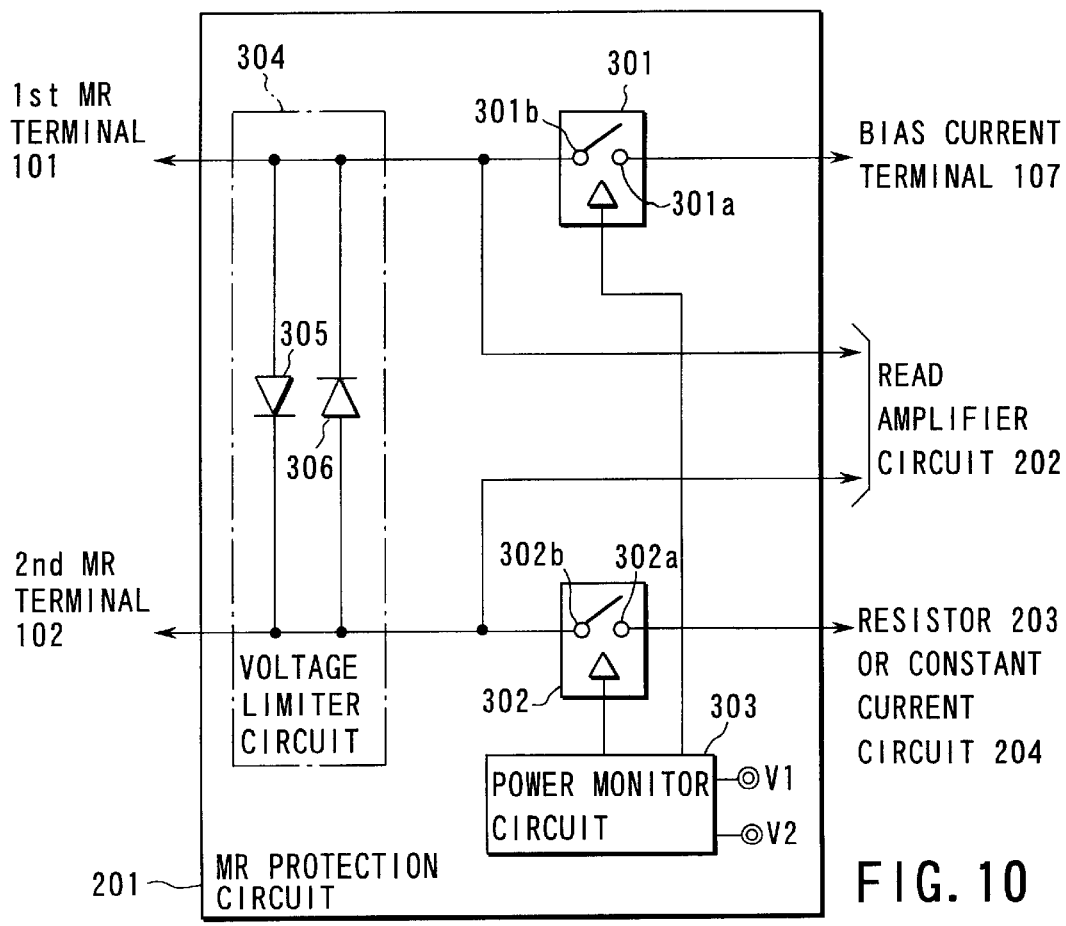
FIG. 10 is a block diagram of the MR protection circuit built into the head IC.

Hereinafter, an arrangement of the MR protection circuit 201 built into the head IC 34 which is mounted on the suspension 30 and arranged as shown in FIGS. 5, 6, 7, 8, or 9 will be described with reference to FIG. 10.

The MR protection circuit 201 includes first and second switches 301 and 302 each of which is turned OFF while the power is not supplied and ON while the power is supplied, a power monitor circuit 303, and a voltage limiter circuit 304.

One pole 301a of the first switch 301 is connected with the bias current terminal 107 of the head IC 34 (with the output of the bias current amplifier circuit 207 when the head IC 34 is arranged as shown in FIG. 9). The other pole 301b of the first switch 301 is connected to the first MR terminal 101 of the head IC 34 and to one input of the read amplifier circuit 202 built into the head IC 34 (when it is arranged as shown in FIGS. 5, 6, 8, or 9) or one input of the read amplifier circuit 202 built into the control IC 53 (when the head IC 34 is arranged as shown in FIG. 7).

Thus, the first switch 301, when turned ON, supplies a bias current from the bias current terminal 107 (from the bias current amplifier circuit 207 when the head IC 34 is arranged as shown in FIG. 9) to the MR element 321 shown in FIGS. 5 to 9 through the first MR terminal 101.

On the other hand, one pole 302a of the second switch 302 is connected either to the resistor 203 (when the head IC 34 is arranged as shown in FIG. 5) or to the constant current circuit 204 (when the head IC 34 is arranged as shown in FIGS. 6 to 9). The other pole 302b of the second switch 302 is connected to the read amplifier circuit 202 built in the head IC 34 (when the head IC 34 is arranged as shown in FIGS. 5, 6, 8, or 9) or to the read amplifier circuit 202 built in the control IC 53 (when the head IC 34 is arranged as shown in FIG. 7), and to the second MR terminal 102 of the head IC 34.

Thus, the second switch 302 allows the bias current supplied to the MR element 321 through the first MR terminal 101 to flow through the MR element 321 and then return to the second power supply terminal 106 at V2 through the second MR terminal 102 and the resistor 203 or the constant current source 204.

The first and second switches 301 and 302 are subjected to ON/OFF control by the power monitor circuit 303. That is, the power monitor circuit 303 monitors the power supplies V1 and V2 and, when V1 and V2 reach predetermined levels or in predetermined ranges, turns ON the first and second switches 301 and 302. In other words, when the power is OFF, the first and second switches 301, 302 are turned OFF. In the assembly process of HSA 28 during which the power is OFF, therefore, the MR protection circuit 201 in the head IC 34 provides isolation between the MR head 32 and the soldering portion 70b of the relay FPC 70 of the HSA 28, so that, even if ESD occurs in the vicinity of the soldering portion 70b through the worker, the MR element 321 can be protected from electrostatic breakdown. If the MR protection circuit 201 were provided on the side of the board unit 17, then such an effect would not be provided.

In the MR protection circuit 201, a voltage limiter circuit 304 is connected between the pole 301b of the first switch 301 and the pole 302b of the second switch 302, which has a pair of diodes 305 and 306 connected in parallel with opposite polarity. For this reason, even if ESD occurs for some cause while the power is supplied and hence the first and second switches 301, 302 are placed in the ON state, the voltage between the first and second MR terminals 101 and 102 will not exceed a constant voltage determined by the backward characteristic of the diodes 304 and 305, thus protecting the MR element 321 connected between the first and second MR terminals 101 and 102 from electrostatic breakdown.

[Arrangement of Control IC 53]

Next, an arrangement of the control IC 53 mounted on the board unit 17 will be described with reference to FIG. 11 taking, as an example, the case where the MR protection circuit 210 and the read amplifier circuit 202 are built into the head IC 34 as shown in FIG. 5 and the write driver circuit 205 is built into the control IC 53.

Into the control IC 53 are built a head switching circuit 410, a bias current circuit 420, a buffer amplifier circuit 430, a write current circuit 206, a serial/logic control circuit 440, a power ON/OFF circuit 450, and a fault/safe circuit 460.

The head switching circuit 410 in the control IC 53 includes write driver circuits 205 and operational circuits 411, which correspond in number to the MR heads 32. At the time of reading, the head switching circuit 410 supplies the bias current terminal 107 (see FIG. 5) of the head IC 34 corresponding to the MR element 321 of a selected MR head 32 with a bias current the value of which is set by the bias current circuit 420 as a constant current circuit.

The bias current supplied from the head switching circuit 410 to the head IC 34 is supplied to the corresponding MR element 321 through the MR protection circuit 201 in the head IC 34 (see FIG. 5). Thereby, data is read by the MR element 321 and the resulting read signal is amplified by the read amplifier circuit 202 (see FIG. 5) in the head IC 34.

The read signal read from the MR element 321 and amplified by the read amplifier circuit 202 in the head IC 34 is output from the read output terminal 108 (see FIG. 5) of the head IC 34 and then input to the corresponding operational amplifier circuit 411 in the control IC 53. The operational amplifier circuit 411 amplifies AC components contained in the read signal amplified by the read amplifier circuit 202 in the head IC 34. The read signal amplified by the operational amplifier circuit 411 is sent through the buffer amplifier circuit 430 to a read/write IC (read/write channel) not shown as read data signals RDX and RDY, where they are decoded into NRZ code data by way of example.

At the time of writing, the head switching circuit 410 switches the direction of current set by the write current circuit 206 at the edges of write data signals WDX and WDY from the read/write IC by the write driver circuit 205 corresponding to the thin-film head 322 of a selected MR head 32 and then supplies the write current to the corresponding thin-film head 322.

The serial/logic control circuit 440 is connected to a serial port 441 for serial data SDATA, a serial data enable signal SDEN representing the timing of serial transfer, and a shift clock SCLK and a signal R/XW for specifying either of disk read and disk write modes. The serial/logic control circuit 440 is responsive to control signals supplied thereto under the control of a CPU (not shown) and the signal R/XW to perform the selection of a head, the setting and ON/OFF control of the bias current, the setting and ON/OFF control of the write current, the control of the power ON/OFF circuit 450, and the control of the fault/safe circuit 460.

The write current circuit 206 is responsive to a control signal from the serial/logic control circuit 440 to set the write current, which, in turn, is supplied to the write driver circuit 205 corresponding to a selected MR head 32.

The bias current circuit 420 is responsive to a control signal from the serial/logic circuit 440 to set the bias current. The set bias current is supplied from the head switching circuit 410 to the head IC 34 corresponding to a selected MR head 32.

The fault/safe circuit 460 is adapted to test each MR head. The circuit 460 is responsive to a control signal from the serial/logic control circuit 440 to switch between read and write modes and make a selection from the MR heads 32 and outputs a fault signal representing an abnormality of a selected MR head 32 when signals from the corresponding head IC 32 are abnormal.

Although a description was made of the control IC 53 when the head IC 34 is arranged as shown in FIG. 5, the control IC 53 can be configured likewise even when the head IC 34 is arranged as shown in any one of FIGS. 6 to 9. When the head IC 34 is arranged as shown in FIG. 7, the control IC 53 is arranged such that the read amplifier circuit 202 is connected to the input of each of the operational amplifier circuits 411 in the head switching circuit 410 and the write driver circuits 205 and the write current circuit 206 are removed. When the head IC 34 is arranged as shown in FIG. 8, it is only required to remove the write driver circuits 205 and the write current circuit 206 from the control IC 53. When the head IC 34 is arranged as shown in FIG. 9, that is, when the head IC 34 is equipped with the bias current amplifier circuit 207, it is only required to remove the bias current circuit 420 from the control IC 53.

Although, in the embodiments described so far, the relay FPC 70 as a flexible interconnection board is used for electrical connections between the MR head 32 and the head IC 34 and between the head IC 34 and the control IC 53 through the main FPC 56, conductor cables may be used instead.

According to the present invention, as described above, an integrated circuit device (head IC) having a built-in MR protection circuit for protecting an MR head composed of an MR element for reading and a thin-film head for writing from electrostatic breakdown, is mounted on a suspension that supports the MR head, so that the built-in MR protection circuit effectively functions to avoid electrostatic breakdown even if ESD occurs during the assembly process of incorporating the HSA into the disk drive unit.

According to the present invention, the incorporation of a read amplifier circuit into the head IC mounted on the HSA suspension reduces the distance between the MR head and the read amplifier circuit, thus suppressing noise occurring in interconnections between the magnetic head and the read amplifier circuit and allowing the MR head to display its performance fully for high-density recording.

According to the present invention, the incorporation of a write driver circuit into the head IC mounded on the HSA suspension reduces the distance between the MR head and the write driver circuit, thus reducing inductance associated with interconnections between the magnetic head and the write driver circuit and allowing the write characteristics to be improved.

According to the present invention, even when a head IC is mounted on the HSA suspension and an MR protection circuit and at least one of a read amplifier circuit and a write driver circuit are incorporated into the head IC, the number of interconnections extending from the HSA is allowed to be six in total, thus checking an increase in the soldering cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head IC (Integrated Circuit) for use in a magnetic disk drive including a head suspension assembly having a magnetic head constituted by a magnetoresistive element for reading data and a head element for writing data, a slider for holding the magnetic head above a surface of a rotating magnetic recording medium, and a suspension for supporting the slider, the head IC being mounted on the suspension, the head IC comprising:

first and second MR terminals connected to both ends of the magnetoresistive element;

a bias current terminal connected to receive an externally supplied bias current; and a protection circuit, connected with the first and second MR terminals and the bias current terminal, for protecting the magnetoresistive element from electrostatic breakdown, wherein the protection circuit includes:

a first switch circuit for connecting/disconnecting one of the first and second MR terminals to/from the bias current terminal; and a second switch circuit for connecting/disconnecting the other of the first and second MR terminals to/from a ground or negative power supply terminal.

2. The head IC according to claim 1, wherein the protection circuit includes a voltage limiter circuit, connected between the first and second MR terminals, for limiting a voltage between the first and second MR terminals to a constant value or less.

3. The head IC according to claim 1, wherein each of the first and second switch circuits is placed in a disconnected state while power is not supplied and in a connected state while power is supplied.

4. A head IC (Integrated Circuit) for use in a magnetic disk drive including a head suspension assembly having a magnetic head constituted by a magnetoresistive element for reading data and a head element for writing data, a slider for holding the magnetic head above a surface of a rotating magnetic recording medium, and a suspension for supporting the slider, the head IC being mounted on the suspension, the head IC comprising:

first and second MR terminals connected to both ends of the magnetoresistive element;

a bias current terminal connected to receive an externally supplied bias current;

a protection circuit, connected with the first and second MR terminals and the bias current terminal, for protecting the magnetoresistive element from electrostatic breakdown; and a bias current amplifier circuit, connected between the protection circuit and the bias current terminal, for amplifying a bias current supplied from the bias current terminal, wherein the protection circuit includes:

a first switch circuit for connecting/disconnecting one of the first and second MR terminals to/from the bias current terminal; and a second switch circuit for connecting/disconnecting the other of the first and second MR terminals to/from a ground or negative power supply terminal.

5. The head IC according to claim 4, wherein the protection circuit includes a voltage limiter circuit, connected between the first and second MR terminals, for limiting a voltage between the first and second MR terminals to a constant value or less.

* * * * *